United States Patent
Stebner et al.

(10) Patent No.: US 12,043,229 B2
(45) Date of Patent: Jul. 23, 2024

(54) METHOD FOR CONTROLLING THE BRAKING POWER IN AN ELECTROHYDRAULIC BRAKING SYSTEM OF A MOTOR VEHICLE

(71) Applicant: VOLKSWAGEN AKTIENGESELLSCHAFT, Wolfsburg (DE)

(72) Inventors: Frank Stebner, Braunschweig (DE); Tobias Wagner, Wolfsburg (DE); Matthias Körner, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 596 days.

(21) Appl. No.: 17/257,746

(22) PCT Filed: Jun. 27, 2019

(86) PCT No.: PCT/EP2019/067104
§ 371 (c)(1),
(2) Date: Jan. 4, 2021

(87) PCT Pub. No.: WO2020/007694
PCT Pub. Date: Jan. 9, 2020

(65) Prior Publication Data
US 2021/0276523 A1    Sep. 9, 2021

(30) Foreign Application Priority Data
Jul. 4, 2018  (DE) ................. 10 2018 211 051.4

(51) Int. Cl.
*B60T 17/22*    (2006.01)
*B60T 8/1766*    (2006.01)
(Continued)

(52) U.S. Cl.
CPC .......... *B60T 13/686* (2013.01); *B60T 8/1766* (2013.01); *B60T 8/326* (2013.01); *B60T 8/4872* (2013.01);
(Continued)

(58) Field of Classification Search
CPC ...... B60T 13/686; B60T 17/22; B60T 17/221; B60T 2270/406; B60T 8/1766;
(Continued)

(56) References Cited

U.S. PATENT DOCUMENTS 5,727,852 A * 3/1998 Pueschel ................. B60T 8/268
                                                188/DIG. 1
8,762,020 B2 * 6/2014 Ummer .................. B60T 17/221
                                                        701/70
(Continued)

FOREIGN PATENT DOCUMENTS

DE    19936435 A1    5/2000
DE    10035179 A1    1/2002
(Continued)

OTHER PUBLICATIONS

Search Report for International Patent Application No. PCT/EP2019/067104; Sep. 6, 2019.

*Primary Examiner* — Bradley T King
(74) *Attorney, Agent, or Firm* — Barnes & Thornburg LLP

(57) ABSTRACT

A method for controlling the braking power in an electrohydraulic braking system of a transportation vehicle which includes initiating a braking process; detecting a current state of the electrohydraulic braking system; increasing the braking pressure based on the current state of the electrohydraulic braking system, wherein braking pressure is built up more rapidly by targeted, staggered supply of braking pressure to individual parts of the braking system.

19 Claims, 2 Drawing Sheets

(51) Int. Cl.
 *B60T 8/32* (2006.01)
 *B60T 8/48* (2006.01)
 *B60T 13/68* (2006.01)

(52) U.S. Cl.
 CPC .......... *B60T 13/683* (2013.01); *B60T 17/221* (2013.01); *B60T 2201/12* (2013.01); *B60T 2270/406* (2013.01)

(58) Field of Classification Search
 CPC .... B60T 8/326; B60T 8/4872; B60T 2201/12; B60T 13/683
 See application file for complete search history.

(56) References Cited

U.S. PATENT DOCUMENTS

| | | | |
|---|---|---|---|
| 9,010,881 B2* | 4/2015 | Sekiya | B60L 7/26 188/1.11 R |
| 9,539,992 B2 | 1/2017 | Svensson | |
| 9,592,812 B2 | 3/2017 | Svensson et al. | |
| 9,604,615 B2* | 3/2017 | Dorsch | B60T 8/4872 |
| 9,963,134 B2 | 5/2018 | Ross et al. | |
| 10,953,858 B2 | 3/2021 | Hitzel et al. | |
| 2004/0090347 A1* | 5/2004 | Yoshino | B60T 17/221 340/933 |
| 2006/0138861 A1* | 6/2006 | Buschmann | B60T 8/4081 303/122.08 |
| 2007/0114838 A1* | 5/2007 | Bitz | B60T 8/4081 303/11 |
| 2008/0058162 A1* | 3/2008 | Schmidt | B60T 8/17555 303/121 |
| 2009/0306871 A1* | 12/2009 | Alford | B60T 8/4872 701/71 |
| 2014/0316643 A1* | 10/2014 | Svensson | B60T 13/662 701/33.9 |
| 2017/0297452 A1* | 10/2017 | Cho | B60T 1/10 |
| 2018/0126971 A1 | 5/2018 | Leiber et al. | |

FOREIGN PATENT DOCUMENTS

| | | |
|---|---|---|
| DE | 10254818 A1 | 6/2004 |
| DE | 10320175 A1 | 12/2004 |
| DE | 102009012007 A1 | 9/2010 |
| DE | 102013001775 A1 | 1/2014 |
| DE | 102015206918 A1 | 12/2015 |
| DE | 102015207636 A1 | 12/2015 |
| DE | 102016202224 A1 | 8/2017 |
| DE | 102016218337 A1 | 3/2018 |
| WO | 2015044383 A1 | 4/2015 |
| WO | 2016146223 A2 | 9/2016 |
| WO | 2017207147 A1 | 12/2017 |

* cited by examiner

METHOD FOR CONTROLLING THE BRAKING POWER IN AN ELECTROHYDRAULIC BRAKING SYSTEM OF A MOTOR VEHICLE

PRIORITY CLAIM

This patent application is a U.S. National Phase of International Patent Application No. PCT/EP2019/067104, filed 27 Jun. 2019, which claims priority to German Patent Application No. 10 2018 211 051.4, filed 4 Jul. 2018, the disclosures of which are incorporated herein by reference in their entireties.

SUMMARY

Illustrative embodiments relate to a method for controlling the braking force in an electrohydraulic brake system of a transportation vehicle, and to an electrohydraulic brake system.

BRIEF DESCRIPTION OF THE DRAWINGS

Disclosed embodiments are described in detail with reference to the drawings. Here, the features mentioned in the claims and in the description may be essential in each case on their own or in any desired combination. In the drawings:

DETAILED DESCRIPTION

Figure 1:
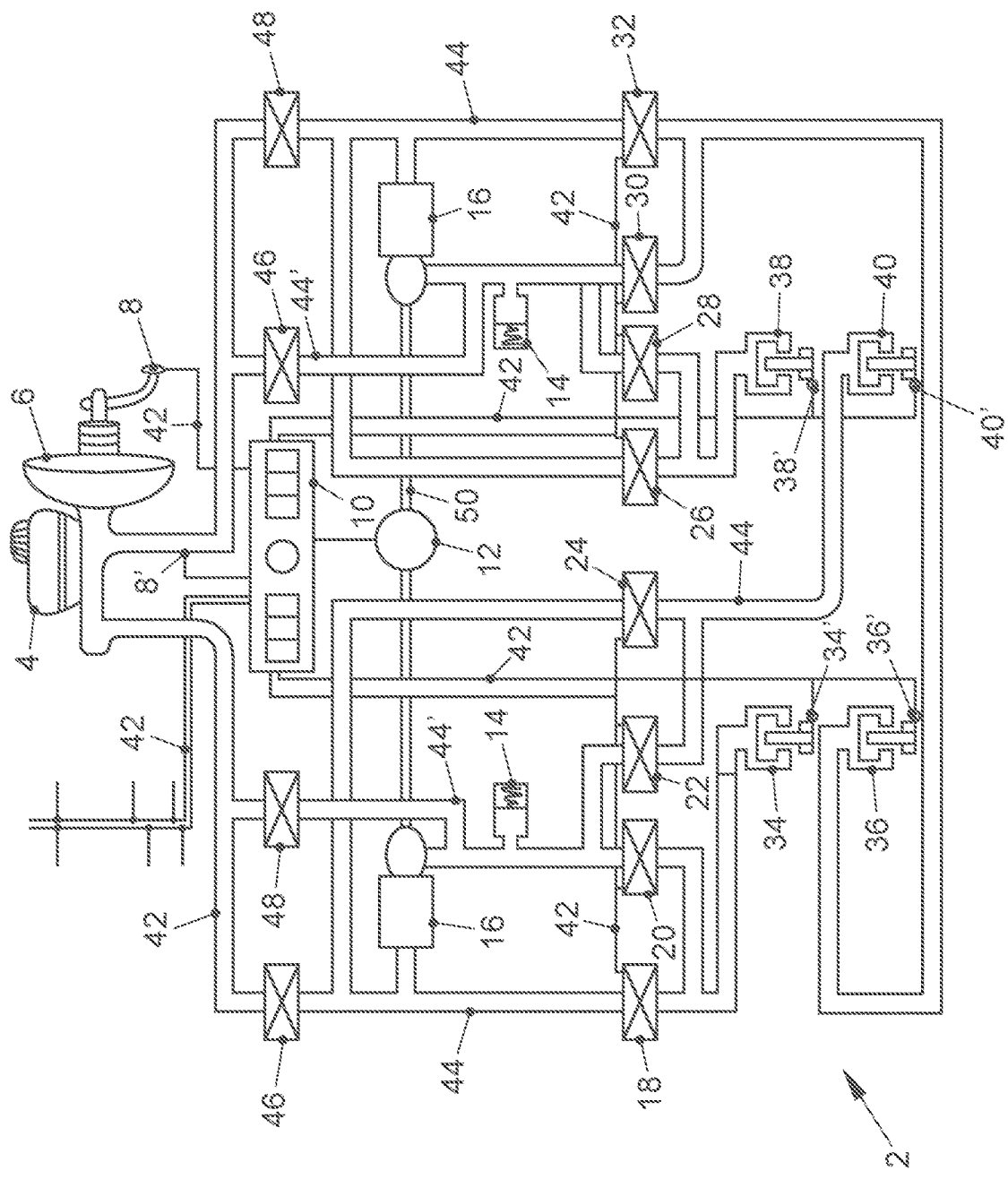
FIG. 1 shows a schematic circuit layout of an exemplary electrohydraulic brake system.

The document WO 2016/146223 A2 relates to a brake system for transportation vehicles. Here, the document provides an inexpensive brake system with high closed-loop control quality and closed-loop control performance. This is achieved here in that, with the use of only a minimal number of valves, sensors and pressure transducers and only one small and inexpensive motor as a drive for the pressure supply unit, through the application of a novel intelligent multiplexing method, a substantially simultaneous pressure dissipation and pressure build-up in different brake circuits is made possible. A drawback of the brake system is that, in the event of high thermal loading, boiling of brake fluid can occur, which has the effect that the brake system cannot build up the brake pressure required for braking, which can ultimately lead to failure of the brake system.

The document DE 10 2013 001 775 A1 relates to a method for controlling the braking force in an electrohydraulic brake system having a master brake cylinder provided for actuation by a brake pedal, having wheel brake cylinders and having an ESC system, wherein the ESC system comprises a control unit and an external power supply with hydraulic pump, which generates the brake pressure at the wheel brake cylinders in the ESC system. Here, the document provides a method for controlling the braking force in an electrohydraulic brake system, in the case of which method, in the event of boiling of brake liquid, a loss of the braking capability is counteracted by virtue of the gas bubbles formed in the event of boiling being quickly detected and compressed by an increase in pressure within the brake system. In this way, the ESC system again provides an adequate brake pressure. The drawback of the method is that it requires high outlay in terms of construction, and the compensation of the lost braking force often cannot be restored quickly enough, such that, even with the implementation of the method, failures of the brake system and thus severe accidents can occur.

Disclosed embodiments at least partially eliminate the above-described drawbacks, and in a simple manner in terms of construction, ensure a restoration of the required brake pressure in the event of boiling of brake liquid.

This is achieved by a method and a brake system.

The technical features discussed with regard to the disclosed method also apply here in conjunction with the disclosed brake system and vice versa, such that reference is always or can always be made reciprocally with respect to the disclosure of the individual embodiments of the disclosure.

The disclosed method for controlling the braking force in an electrohydraulic brake system of a transportation vehicle may be used here in a passenger transportation vehicle or a heavy goods transportation vehicle, but also in an excavator, a forklift truck or the like. In the context of the disclosure, the braking force is to be understood to mean the force imparted by the brake system for a braking operation. A braking operation in a transportation vehicle is furthermore to be understood to mean an operation by which the speed of the respective transportation vehicle is at least reduced.

In the disclosed method for controlling the braking force in an electrohydraulic brake system, a braking operation is firstly commenced. Here, a braking operation may be initiated by various actuating method or mechanism, in particular, by a brake pedal. Here, the actuating operation performed by the user, such as, for example, the depression of a brake pedal, may be detected by a corresponding sensor arrangement, for example, a brake pedal sensor arrangement.

The commencement of a braking operation with the aid of a corresponding actuating method or mechanism is followed, in the context of the disclosed method, by the detection of a present state of the electrohydraulic brake system. The detection of a present state of the brake system is performed here with regard to the present state of the brake fluid used in the brake system. In the context of the disclosure, it has been identified that, in particular, the state of the brake fluid arranged in a brake system constitutes a critical variable for the state of the brake system itself. For example, every usable brake fluid is, to prevent the absorption of free water, imperatively of hygroscopic form, and therefore very strongly absorbs water in bound form. A corresponding content of bound water in brake fluids is therefore inevitable. As a result of the absorption of the bound water, the boiling point of the respective brake fluid or of the azeotropic mixture falls, which leads to boiling of the liquid in the event of high thermal loading. If the brake fluid or the azeotropic mixture boils, gas bubbles form within the brake fluid, which gas bubbles counteract the pressure build-up required for a braking operation. Here, if too many gas bubbles or excessively large gas bubbles form, this can lead to a complete failure of the respective brakes and thus to disastrous accidents. Even a mass fraction of 3% water in the brake fluid can lead to complete failure of a brake system.

The detection of a present state of the brake system, in particular, the detection of a present state of the brake fluid, may be performed here in at least two operations, a first operation of an ascertainment of a value for making statements with regard to a present state of the brake system on the basis of measured values, and a second operation of an evaluation of the ascertained value on the basis of a comparison with at least one reference value.

In the course of the first operation for the ascertainment of a value for making statements with regard to a present state of the brake system, use may be made of a vapor bubble monitoring sensor within the brake system, which vapor bubble monitoring sensor quickly and sensitively detects vapor bubble formation within the brake system, and on the basis of which vapor bubble monitoring sensor it is thus possible for statements to be made regarding a present state of the brake system or a present state of the brake fluid. Here, other sensors may also be alternatively or cumulatively arranged within the brake system, which sensors are capable of detecting data, on the basis of which an authoritative assessment with regard to the present state of the brake system or of the brake fluid is possible. The sensors that can be used may in this case detect data from pressure measurements, viscosity measurements, temperature measurements, rotational speed measurements or the like. With regard to a particularly authoritative ascertainment of values for making statements with regard to a present state of a brake system, it is the case that, before the ascertainment, an averaging and/or weighting and/or some other method is performed for the purposes of cleaning up measurement inaccuracies and/or errors resulting from fluctuating ambient conditions and/or system dependencies.

To finally be able, in a second operation, to evaluate the value ascertained on the basis of the detected measured values, it may be the case that a comparison of the ascertained values with a reference value is finally performed. Here, the values ascertained on the basis of the sensors may also, with regard to an authoritative evaluation, be averaged and/or weighted before a comparison with reference values.

According to the method to which the subject matter relates, a detection of a present state of a brake system is followed by an increase of the brake pressure in a manner dependent on the present state of the electrohydraulic brake system. Here, the operation of the increase of the brake pressure may be performed only after a certain threshold value has been overshot or undershot. Here, by way of example, the deviation of the value ascertained on the basis of the sensors from the reference value may serve as threshold value. If this deviation is too great, then an increase of the brake pressure may be performed in accordance with the disclosed embodiments. Here, use may be made either of the absolute deviation or else of the relative deviation in relation to the magnitude of the respective measured variable. An increase of the brake pressure may be performed, for example, by pumps, in particular, by ESC pumps arranged in transportation vehicles.

According to the characterizing feature of the disclosed method, the brake pressure increase is performed here such that a faster brake pressure build-up is performed by a targeted, temporally mutually separate supply of brake pressure to individual parts of the brake system. This is expedient with regard to the knowledge, obtained in the context of the disclosure, that the compensation of lost braking force attained by a simple brake pressure increase commonly does not occur quickly enough, such that, despite a brake pressure increase, failures of the brake system and thus severe accidents can occur. The faster brake pressure build-up is based here on the fact that, in the case of a targetedly temporally mutually separate supply of brake pressure—at least in the case of the supply to intact parts of the brake system—it is not necessary to accept any losses of time resulting from pressure equalization flows.

With regard to fast and effective control, it is conceivable here in the context of the disclosed method that the operation of the increase of the brake pressure in a manner dependent on the present state of the electrohydraulic brake system is performed by the opening and closing of centrally controlled electric valves. With regard to a straightforward and inexpensive implementation of the disclosed method, it may be possible here to use the ABS inlet valves and ABS outlet valves that are commonly arranged in transportation vehicles.

In the context of an effective method which is controllable in the most flexible manner possible, it may furthermore be provided that the targeted, temporally mutually separate supply of brake pressure to individual parts of the brake system is performed in alternation. By alternating opening and closing, it is possible for brake pressure to be supplied to different parts of a brake system in a short time without the risk of losses resulting from equalization flows. An alternating, temporally mutually separate supply of brake pressure to individual parts of the brake system may in this case be performed by alternating opening and closing of the ABS inlet valves.

With regard to a temporally separate supply to individual parts of the brake system, it may furthermore be provided in the context of the disclosure that brake pressure is supplied to the front axle and the rear axle of the transportation vehicle in a temporally mutually separate manner during the increase of the brake pressure. As already stated, a temporally mutually separate supply to individual parts of the brake system is expedient for avoiding pressure losses resulting from equalization flows. Since it has been identified according to the disclosed embodiments that a non-uniform braking load exists with respect to the axles of a transportation vehicle, it is expedient, with regard to a separation of parts of the brake system, to supply brake pressure to at least the front axle and rear axle in a temporally mutually separate manner. Thus, more pressure is available for a smaller volume, which has a positive effect on the time to attain the required brake pressure. Alternatively, provision may also be made for braking fluid to be supplied separately to only one side, that is to say, for example, the right-hand wheel brake cylinders at the front and rear or the left-hand wheel brake cylinders at the front and rear, or else to only individual wheel brake cylinders.

In the context of a particularly reliable and at the same time efficient exemplary embodiment of the method to which the subject matter relates, it may furthermore be provided that, upon commencement of the method, brake pressure is supplied initially only to the rear axle, whereas the front axle remains separate from the brake pressure supply. This is expedient against the background of the knowledge, obtained in the context of the disclosure, that the front axle of transportation vehicles is generally subject to a considerably higher braking load than the rear axle. Owing to the higher braking load, the thermal load on the front axle is also considerably higher, whereby the described problem of vapor bubble formation occurs significantly more frequently at the front axle. By virtue of the fact that, now, upon commencement of the disclosed method, brake pressure is supplied initially only to the rear axle, reliable braking by the generally still-intact wheel brake cylinders of the rear axle is generally possible in the first instance. By a separate supply to this generally still-intact axle, initially the entire available braking force is supplied to the axle, which allows considerably faster braking. By virtue of the fact that, after the execution of a braking operation by the rear axle, the entirety of the available braking fluid is supplied to the front axle, a considerably faster compression of the vapor bubbles that are generally arranged at the front axle is furthermore subsequently also possible.

It is possible in the context of the disclosed method, in particular, in the case of an alternating supply of brake pressure to the individual parts of the brake system, for the lengths of the time intervals in which brake pressure is supplied to individual parts of the brake system to vary in a manner dependent on the respective parts of the brake system. Thus, the build-up of the required brake pressure at the front axle—in the case of vapor bubbles arranged in the region—generally takes a longer period of time than the build-up of the required brake pressure at the generally intact rear axle. Therefore, provision may be made according to the disclosed embodiments for the time interval of the separate supply of brake pressure to the rear axle to be made shorter, for example, 0.5 seconds, whereas the time interval of the separate supply of brake pressure to the front axle can be made longer, for example, 2-3 seconds.

The disclosure likewise encompasses an electrohydraulic brake system having the features of the independent device claim. Here, it is provided according to the subject matter that the electrohydraulic brake system has an actuating method or mechanism, for example, a brake pedal and the associated brake pedal sensor arrangement, for commencing a braking operation, and a detection unit, for example, a vapor bubble monitoring sensor, for detecting a present state of the electrohydraulic brake system. Furthermore, the electrohydraulic brake system according to the subject matter has a closed-loop pressure control unit, for example, an ESC pump, for increasing the brake pressure in a manner dependent on the present state of the electrohydraulic brake system, and a control unit, for example, a valve control unit, for the targeted distribution of the braking compressed fluid, wherein, here, the control unit is configured such that, by use thereof, a faster brake pressure build-up is performed by a targeted, temporally mutually separate supply of brake pressure to individual parts of the brake system. Thus, the disclosed electrohydraulic brake system yields the same benefits as have already been described in detail with regard to the disclosed method. The disclosed brake system may either be formed as a mobile or at least partially mobile system or else be integrated into a transportation vehicle. To ensure flexible, uncomplicated and efficient communication of the individual components of the brake system to which the subject matter relates, the individual components may communicate wirelessly on the basis of a server or cloud and/or via the Internet.

With regard to particularly fast, sensitive and spatially resolved detection of gas bubbles formed within the brake system, it may furthermore be provided according to the disclosure that the electrohydraulic brake system comprises at least two mutually separately arranged detection units for detecting a present state of the electrohydraulic brake system. Here, it is then the case that at least one of the two mutually separately arranged detection units is arranged in the region of the front axle, and the other is arranged in the region of the rear axle.

The subject matter of the disclosure furthermore likewise encompasses a transportation vehicle comprising an electrohydraulic brake system as described above.

In the figures, the same technical features will be denoted by identical reference designations.

FIG. 1 shows a schematic circuit layout of the electrohydraulic brake system 2 according to the subject matter for executing the disclosed method in a transportation vehicle. Here, in the present case, the brake system comprises a reservoir 4 which is filled with brake fluid, a brake booster 6, and a brake pedal sensor arrangement 8, which is connected to a brake pedal (not illustrated here) or some other actuating method or mechanism. Furthermore, the brake system 2 comprises a control unit 10 for controlling the disclosed method, and a return delivery pump 12 and a pressure accumulator 16, which is correspondingly connected via a pressure feed line 50 to the return delivery pump 12, for providing the required brake pressure. To control the disclosed method, the control unit is connected to the other components, such as the valves 18, 20, 22, 24, 26, 28, 30, 32, 46, 48, the brake pedal sensor arrangement 8, the detection unit 8', the rotational speed sensors 34', 36', 38', 40', the return delivery pump 12 and other transportation vehicle components, via the control line 42.

During the normal operation of the brake system 2, as soon as a signal for the triggering of a braking operation is detected by the brake pedal sensor arrangement 8—the switching valves 46 and the high-pressure switching valves 48 are closed. At the same time, the ABS inlet valves 18, 24, 26 and 32 are opened, such that the wheel brake cylinders of the transportation vehicle 34, 36, 38 and 40 are, when a braking operation has been initiated, supplied equally with braking compressed fluid via the brake pressure feed line 44 from the return delivery pump 12 and/or the pressure accumulators 16. Here, by contrast, the ABS outlet valves 20, 22, 28 and 30 remain closed so as not to again discharge, via the brake pressure discharge line 44', the pressure prevailing within the brake pressure feed line 44. As a result, a sufficient quantity of braking compressed fluid or braking force is available for each tire of the transportation vehicle to be able to perform one or more braking operations as soon as a corresponding triggering signal is induced by a brake pedal and registered by the brake pedal sensor arrangement 8.

In the presence of high thermal load, however, boiling of brake fluid may occur in a manner based on the state of the brake fluid, in particular, in a manner based on the temperature and the quantity of water absorbed into the brake fluid. Since brake fluid is imperatively hygroscopic to avoid the absorption of free water and therefore very strongly absorbs water in bound form, a corresponding content of bound water in brake fluids is inevitable. As a result of the absorption of the bound water, the boiling point of the respective brake fluid falls, which leads to the abovementioned boiling process. If the brake fluid boils, gas bubbles form within the brake fluid, which gas bubbles counteract the pressure build-up required for a braking operation. Here, if too many gas bubbles or excessively large gas bubbles form, this can lead to a complete failure of the respective brakes and thus to disastrous accidents.

To counteract this, the brake system 2 has at least one detection unit 8' for detecting gas bubbles present within the brake fluid. It is also possible for several such detection units 8' to be arranged within the brake system, in particular, in the vicinity of the wheel brake cylinders 34, 36, 38 or 40, to allow particularly fast and spatially resolved detection of such vapor bubbles. Here, the detection unit 8' may detect the presence of gas bubbles in the brake fluid in different ways, for example, on the basis of a pressure measurement, a viscosity measurement, a temperature measurement or the like.

In the execution of the disclosed method, it is now firstly the case that the ABS inlet valves 18 and 26 arranged at the front axle of the transportation vehicle, which are open during normal operation, are closed for a certain time interval. During this period, the braking compressed fluid present within the brake system 2 is thus available only to the wheel brake cylinders 36 and 40 arranged at the rear axle of the transportation vehicle. This is expedient with regard to the knowledge that detected vapor bubble formation occurs, in the majority of all cases, at the front axle. Thus, the available braking compressed fluid can be made available only to the rear axle. In this way, an undesired pressure equalization between parts of the brake pressure feed line 44 arranged at the front axle and parts of the brake pressure feed line 44 arranged at the rear axle can be avoided, whereby reliable braking by the wheel brake cylinders 36 and 40 arranged at the rear axle is initially ensured.

After the described supply of braking compressed fluid to the rear axle for a certain time interval, it is now provided according to the disclosure that the ABS inlet valves 18 and 26 be opened, and at the same time the ABS inlet valves 24 and 32 be closed, such that the entirety of the available braking compressed fluid is now made available exclusively to the front axle. In this way, in turn, an undesired pressure equalization between parts of the brake pressure feed line 44 arranged at the front axle and parts of the brake pressure feed line 44 arranged at the rear axle can be avoided, whereby, in the case of gas bubbles being present in the region of the front axle, considerably better and more effective compression of the gas bubbles occurs, which thus results in a considerable improvement in the braking action.

After the separate supply of braking compressed fluid to the front axle that has now likewise occurred, it is now again the case here that the ABS inlet valves 18 and 26 are closed, and the ABS inlet valves 24 and 32 are opened, for a certain time interval, such that the entirety of the available braking compressed fluid is now again made available exclusively to the rear axle.

This separate supply of braking compressed fluid to the front axle and rear axle performed alternatingly may be repeated as often as desired. In this way, not only is a faster and more effective compression of gas bubbles arranged within the brake fluid possible, but it is also the case that a faster build-up of the brake pressure required for a braking process is achieved if the brake pressure falls as a result of the formation of gas bubbles within the brake fluid, such that the present method significantly improves the safety of brake systems.

Aside from the separated feed of braking compressed fluid to the front axle and rear axle that is provided in the present case, it is furthermore likewise possible on the basis of the construction according to the disclosure for brake pressure to be supplied separately to only the wheel brake cylinders 34 and 36, or 38 and 40, arranged on one side of the transportation vehicle, or even to individual wheel brake cylinders 34, 36, 38 or 40.

Figure 2:
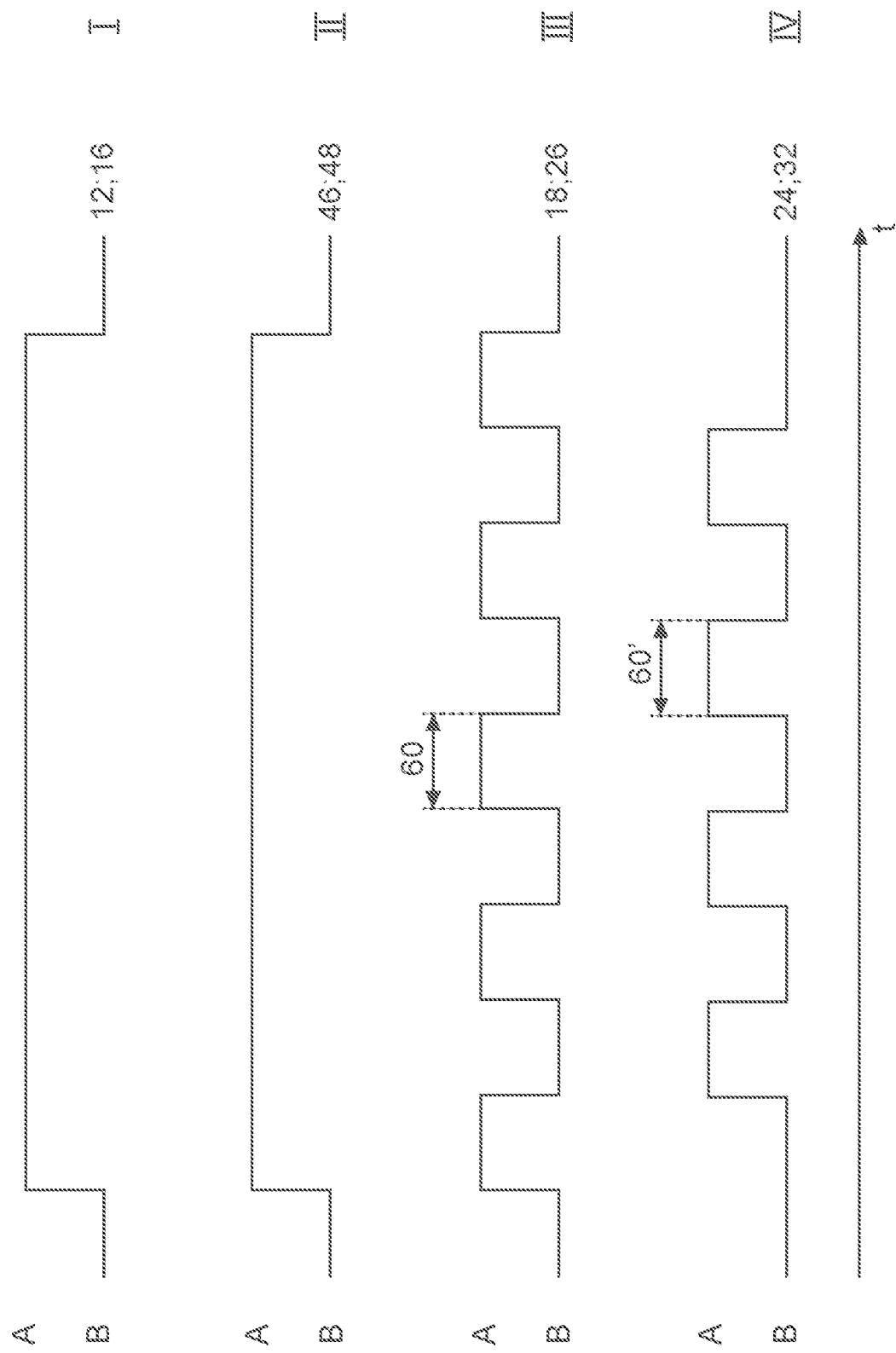
FIG. 2 is a schematic illustration of the valve switching processes during the execution of the disclosed method.

FIG. 2 is a schematic illustration of the valve switching processes during the execution of the disclosed method. Here, in a first switching process (I), the return delivery pump 12 and the pressure accumulator 16 are brought from a deactivated state (B) into an activated state (A). At the same time, in a further switching process (II), the switching valves 46 and the high-pressure switching valves 48 are closed by the application of a voltage. In the further two switching processes III and IV illustrated in FIG. 2, the switching processes of the ABS inlet valves (18, 26) arranged at the front axle and the switching processes of the ABS inlet valves (24, 32) arranged at the rear axle are illustrated. Here, considered in terms of time, with the return delivery pump 12 active and pressure accumulator 16 open and the valves 46 and 48 closed, it is firstly the case that the ABS inlet valves arranged at the front axle are closed by virtue of a corresponding valve voltage being applied (state B to state A). During this first time interval 60, the entirety of the available braking compressed fluid is now made available to the wheel brake cylinders 36, 40 arranged at the rear axle, whereby—as already described—an undesired pressure equalization between parts of the brake pressure feed line 44 arranged at the front axle and parts of the brake pressure feed line 44 arranged at the rear axle is avoided, and, if no vapor bubbles are present at the rear axle, reliable braking is initially ensured by the wheel brake cylinders 36 and 40 arranged at the rear axle.

Only with the closure of the ABS inlet valves 24 and 32 arranged at the rear axle (first switching process as per IV) by the application of the corresponding valve voltage are the ABS inlet valves 18 and 26 arranged at the front axle opened by a corresponding withdrawal of the control voltage, such that, during the time interval 60', the entirety of the available braking compressed fluid is now made available to the wheel brake cylinders 34, 38 arranged at the front axle. This process is, as illustrated here, repeated multiple times. By such alternating opening and closing of the ABS inlet valves of the front axle and rear axle, a separated supply of braking compressed fluid is thus ensured. The time intervals illustrated here as being of equal length may in this case vary in terms of time both within the individual axles and also between the axles. Thus, in the event of vapor bubble detection in the region of the front axle, the time interval 60 for the separate supply to the rear axle may generally be shorter, optionally approximately 0.5 seconds, whereas the time interval 60' for the separate supply to the front axle may generally, owing to the time that has to be expended for compressing the vapor bubbles, be somewhat longer, and is optionally approximately 2-3 seconds.

LIST OF REFERENCE DESIGNATIONS

2 Electrohydraulic brake system
4 Reservoir
6 Brake booster
8 Brake pedal sensor arrangement
8' Detection unit
10 Control unit
12 Return delivery pump
14 Damping chamber
16 Pressure accumulator
18 ABS inlet valve, front left
20 ABS outlet valve, front left
22 ABS outlet valve, rear right
24 ABS inlet valve, rear right
26 ABS inlet valve, front right
28 ABS outlet valve, front right
30 ABS outlet valve, rear left
32 ABS inlet valve, rear left
34 Wheel brake cylinder, front left
34' Rotational speed sensor, front left
36 Wheel brake cylinder, rear left
36' Rotational speed sensor, rear left
38 Wheel brake cylinder, front right
38' Rotational speed sensor, front right
40 Wheel brake cylinder, rear right
40' Rotational speed sensor, rear right
42 Control line
44 Brake pressure feed line
44' Brake pressure discharge line
46 Switching valve
48 High-pressure switching valve
50 Pressure feed line
60 Switching time interval

The invention claimed is:

1. A method for controlling the braking force in an electrohydraulic brake system of a transportation vehicle, the method comprising:
commencing a braking operation;
detecting a present state of the electrohydraulic brake system, wherein the detection of the present state detects a measured value measured by at least one sensor, wherein the measured value is indicative of the presence of gas bubbles in brake fluid in the brake system;
increasing a brake pressure based on the detected present state of the electrohydraulic brake system,
wherein the brake pressure increase is performed only after determination of deviation of the measured value from a reference value thereby indicating the presence of gas bubbles, and
wherein a resulting brake pressure build-up is performed by a targeted, temporally mutually separate supply of brake pressure to intact individual parts of the electrohydraulic brake system to facilitate the increase of the brake pressure without requiring pressure equalization flow between intact individual parts and non-intact parts of the electrohydraulic brake system.

2. The method of claim 1, wherein the commencement of the braking operation is initiated in response to the actuation of a brake pedal of the transportation vehicle.

3. The method of claim 1, wherein the detection of the present state of the electrohydraulic brake system is performed based on a present state of the brake fluid used in the brake system.

4. The method of claim 1, wherein the increase of the brake pressure based on the present state of the electrohydraulic brake system is performed by opening and closing of centrally controlled electric valves of the brake system.

5. The method of claim 1, wherein the targeted, temporally mutually separate supply of brake pressure to individual parts of the brake system is performed alternatively by alternating opening and closing of centrally controlled electric valves of the brake system to supply different parts of the brake system.

6. The method of claim 1, wherein brake pressure is supplied to a front axle and a rear axle of the transportation vehicle temporarily and mutually separately during the increase of the transportation vehicle brake pressure.

7. The method of claim 1, wherein, upon commencement of the method, brake pressure is supplied initially only to a rear axle, whereas a front axle remains separated from a braking fluid supply providing brake pressure thereto.

8. The method of claim 1, further comprising varying lengths of time intervals in which brake pressure is supplied to individual parts of the transportation vehicle brake system.

9. An electrohydraulic brake system comprising:
an actuator for commencing a braking operation;
a detection unit for detecting a present state of the electrohydraulic brake system, wherein the detection of the present state detects a measured value measured by at least one sensor, wherein the measured value is indicative of the presence of gas bubbles in brake fluid in the brake system;
a closed-loop pressure control unit for increasing the brake pressure based on the present state of the electrohydraulic brake system, wherein the brake pressure increase is performed only after determination of deviation of the measured value from a reference value thereby indicating the presence of gas bubbles; and
a control unit for targeted distribution of the brake pressure, wherein the control unit is configured to control performance of a resulting brake pressure build-up by a targeted, temporally mutually separate supply of brake pressure to intact individual parts of the electrohydraulic brake system to facilitate the increase of the brake pressure without requiring pressure equalization flow between intact individual parts and non-intact parts of the electrohydraulic brake system.

10. The electrohydraulic brake system of claim 9, wherein the brake system comprises at least two mutually separately arranged detection units configured to detect the present state of the electrohydraulic brake system.

11. A transportation vehicle comprising the electrohydraulic brake system of claim 9.

12. The transportation vehicle of claim 11, wherein the brake system comprises at least two mutually separately arranged detection units configured to detect the present state of the electrohydraulic brake system.

13. The brake system of claim 9, wherein the commencement of the braking operation is initiated in response to the actuation of a brake pedal of the transportation vehicle.

14. The brake system of claim 9, wherein the detection of the present state of the electrohydraulic brake system is performed based on a present state of the brake fluid used in the brake system.

15. The brake system of claim 9, wherein the increase of the brake pressure based on the present state of the electrohydraulic brake system is performed by opening and closing of centrally controlled electric valves of the brake system.

16. The brake system of claim 9, wherein the targeted, temporally mutually separate supply of brake pressure to individual parts of the brake system is performed alternatively by alternating opening and closing of centrally controlled electric valves of the brake system to supply different parts of the brake system.

17. The brake system of claim 9, wherein brake pressure is supplied to a front axle and a rear axle of the transportation vehicle temporarily and mutually separately during the increase of the transportation vehicle brake pressure.

18. The brake system of claim 9, wherein, upon commencement of the method, brake pressure is supplied initially only to a rear axle, whereas a front axle remains separated from a braking fluid supply providing brake pressure thereto.

19. The method of claim 9, wherein lengths of time intervals in which brake pressure is supplied to individual parts of the brake system are varied.

* * * * *